Figure 1A:
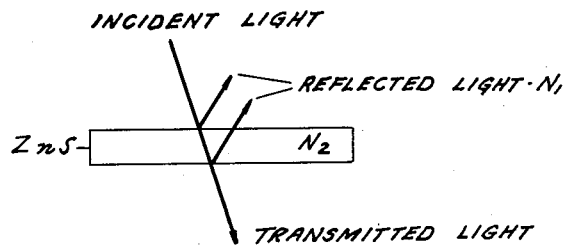

3,123,490
NACREOUS PIGMENT AND METHOD FOR PREPARING SAME

René A. Bolomey, Peekskill, Harold A. Miller, White Plains, and Leon M. Greenstein, Brooklyn, N.Y., assignors to Francis Earle Laboratories, Inc., Peekskill, N.Y., a corporation of New York
Filed May 4, 1961, Ser. No. 107,850
8 Claims. (Cl. 106—291)

This invention relates to nacreous pigments made by a vacuum evaporation process.

It is an object of this invention to produce pigments superior in nacreous or pearlescent luster to those which have been made heretofore either by conventional crystallization techniques or by evaporation techniques.

Another object of the present invention is to produce particles which may be used as inherently colored nacreous pigments, as components of interference filters, and as sources of multiple colors which are obtained from a single color-producing ingredient.

Nacreous pigments are substances which produce a nacreous or pearl-like effect when incorporated in transparent substances like plastics or when applied to surfaces in the form of a paint or lacquer coating. Everyday commercial examples of these uses are seen in simulated pearl shirt buttons, in which nacreous pigment is incorporated in polyester resin or polymethyl methacrylate plastic, and in simulated pearls, in which a lacquer coating containing nacreous pigment is applied to a glass or plastic bead.

The properties of a nacreous pigment are derived from the shape and index of refraction of the pigment particle. This particle must be in the shape of a thin plate and must have an index of refraction different from that of the transparent substance in which the platelet is used. The conventional transparent substances in which nacreous pigments are incorporated have indices of refraction in the range of approximately 1.50 to 1.60, such substances including cellulose nitrate, cellulose acetate, polyvinyl chloride and acetate and their copolymers, polyester resins, polyacrylic resins, epoxy resins, polyethylene, polyproylene, polystyrene, phenol formaldehyde resins and amine-formaldehyde resins.

The currently known nacreous pigments consist of either crystalline or non-crystalline platelets of high index of refraction. These include natural guanine crystals derived from fish (high index of refraction, about 1.85), basic lead carbonate (high index 2.09), lead hydrogen phosphate (high index, about 1.84), bismuth oxychloride (high index, above 2.0), and glass platelets of index of refraction of 1.80 and higher.

An index of refraction different from the incorporating transparent substance assures the reflection of light from the platelet surface. The nacreous luster arises from the simultaneous reflection of light from numerous parallel surfaces. For practical utility, it can be considered that the long dimension of the platelet should be at least four times its thickness and preferably ten times its thickness and that the index of refraction of the platelet should be at least 0.2 different from the supporting medium. The particles of all the nacreous pigments described above have these characteristics.

Many high index of refraction substances which cannot ordinarily be crystallized in the form of platelets can be made into this shape by vacuum sublimation or evaporation, as has been described in U.S. Patent 2,713,004 and also copending application Serial No. 87,062, filed February 6, 1961. In this procedure a thin layer of the substance of suitable refractive index is coated by vacuum evaporation onto a substrate which can be dissolved in a convenient solvent. The evaporated film is thus put into suspension, and is broken into platelets of the desired average size by mechanical fragmentation. Among the substances of high index of refraction which can be made into nacreous pigments by this procedure are zinc oxide, zinc sulfide, guanine as made synthetically, titanium dioxide, and lead chloride.

The platelets ordinarily used as nacreous pigments are of a thickness below that which produces interference phenomena in thin films. These nacreous pigments have a whitish or silvery appearance. For practical purposes, the value of N$d$ where $d$ is the thickness of the film in millimicrons and N is the index of refraction of the film should fall in the range from about 10 to about 200.

In copending applications Serial Nos. 60,793 and 87,062, there is described the production of platelets of greater thickness, causing color to appear through light interference phenomena. Such platelets are one color by reflected light and the complementary color by transmitted light.

Uncolored nacreous pigments can be obtained for values of N$d$ up to 1000 if the film is sufficiently heterogeneous in thickness so that the interference color which arises from one particle of fragmented film is neutralized by the color from another.

In accordance with the present invention, particles such as have been described are caused to have far greater reflectivity and nacreous luster by being made of a plurality of thin, adherent, light-transmitting layers, each differing in refractive index from the adjacent layer. In order to offer an advantage over conventional nacreous pigments, this difference should be greater than the difference in refractive index between the medium into which the nacreous pigment is ultimately incorporated (i.e., the light-transmitting lacquer film or plastic) and the index of the layer having the refractive index most different from that of the supporting medium. In other words, one layer should have a refractive index higher than that of the supporting medium, and the adjacent layer an index lower than that of the supporting medium. Thus, the adjacent lamellae should generally differ in refractive index by at least 0.4.

An example of a two-layer system is the combination of one high refractive index and one low refractive index substance, such as ZnS—MgF$_2$. A three layer system may have a high-low-high or low-high-low configuration, e.g., ZnS—MgF$_2$—ZnS or MgF$_2$—ZnS—MgF$_2$, re-platelets are used in a supporting medium with an index of refraction of approximately 1.5. Multiple layered structures of greater complexity produce still more reflections, but become more difficult to manufacture.

Where color is desired, in increase in color intensity as well as in the reflectivity of each particle is achieved by making each platelet a composite of three or more layers.

The advantages of the layered structure may be seen by taking first the case of a white (or uncolored) nacerous pigment, and second, that of a pigment colored through light interference. For the white pigment, consider the effectiveness of a platelet consisting of three layers (ZnS—MgF$_2$—ZnS), each of which is 25 millimicrons (m$\mu$) thick, in comparison with a platelet composed of a single layer of ZnS 75 m$\mu$ in thickness. The ZnS has an index of refraction of approximately 2.2 and the MgF$_2$ of approximately 1.35. The plate in use will be embedded in a plastic material of index of approximately 1.5.

In the case of the simple, single substance platelet, as can be seen from FIGURE 1A, the amount of light which is reflected at the two surfaces (plastic-ZnS and ZnS-plastic) is determined by a function of the difference in index of refraction. N$_2$ is the index of the platelet (ZnS) and N$_1$ the index of the surrounding medium (the plastic at 1.5). N$_2$—N$_1$ for this case is 0.7. Where interference effects are negligible, R, the ratio of reflected light to incident light, is given by the Fresnel equation. This form of the equation applies to perpendicular incidence, and describes the reflectance at each interface:

$$R = \frac{(N_2-N_1)^2}{(N_2+N_1)^2}$$

Figure 1B:
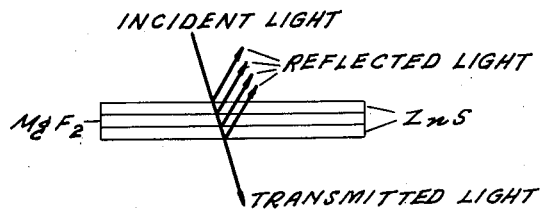

From FIGURE 1B which illustrates a three layer ZnS—MgF$_2$—ZnS platelet, it can be seen that a reflection occurs at the surface of the platelet as in the first instance. A second reflection then occurs at the ZnS—MgF$_2$, interface, where the value of $N_2-N_1$ is 0.85. A third reflection of like magnitude occurs at the MgF$_2$—ZnS interface, and finally a fourth reflection occurs at the ZnS-plastic surface. Not only have two additional reflections been produced for a given total amount of reflecting substance, but the reflections at the ZnS—MgF$_2$ interfaces are greater in magnitude than those possible between ZnS and the plastic.

Furthermore, the thicker platelet has advantages over three 25 m$\mu$ ZnS platelets or a greater number of extremely thin platelets because of its greater resistance to accidental excessive fragmentation. The 75 m$\mu$ thick evaporated film can, of course, be broken down to the desired average size by milling, but it is much less likely to fragment further in use, particularly in such applications as incorporation in plastics, where nacreous pigments are often degraded because of excessive fragmentation during the mixing and molding operations.

In the second example, the production of colored platelets, the thicknesses of the layers are governed by the familiar equations for light interference. Color is dependent on the index of refraction of the components of the thin platelets and the thicknesses of the component layers. The index of refraction of the surrounding medium enters into the expressions also when the light is not perpendicularly incident, but is not a factor in determining color in the case of perpendicular incidence. It is a factor, however, in all cases in determining the intensity of the color.

Interference effects occur when there is interaction between reflections from two surfaces of the platelet. The reflecting surfaces which are most important in determining the color of composite structures are those in which the interference effect of one pair of surfaces is the same as or similar to that of an additional pair or pairs. For example, a three-layered structure has four surfaces, A, B, C, D. When the two outer layers have the same thickness (AB and CD) the interaction between the reflections from A and C are equivalent to the interaction between those from B and D. The most important dimension in the platelet is, therefore, the distance AC, or the sum of the thicknesses of the high and low index layers.

The interference equations for this case, for light perpendicularly incident on the film, are as follows:

The wave length $\lambda$ is missing from the reflection because of the destructive interference when $$\lambda = 4(N_1d_1+N_2d_2)/2n+1$$

The wave length $\lambda$ is reinforced in the reflection when $$\lambda = 2(N_1d_1+N_2d_2)/n$$

In these equations, "$n$" is the order of the reflection, "$N_1$" is the index of refraction of the low index film of thickness "$d_1$" and "$N_2$" is the index of refraction of the high index film whose thickness is "$d_2$."

Other similar equations would describe different combinations of high and low index layers.

The most intense colors occur when the colors derived from the combined thickness of the high and low layer are further supported by other dimensions, such as the thickness of the individual layers or of the overall composite.

Figure 2:
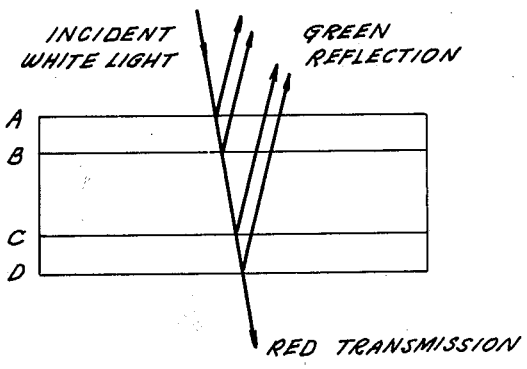

For example, if AB and CD are 59 m$\mu$ layers of ZnS at refractive index 2.2, these are quarter wavelength films with respect to green light of 520 m$\mu$. An intervening quarter wavelength film is provided for BC by 96.4 m$\mu$ MgF$_2$ at refractive index 1.35. The interaction of the reflections from A and C produces intense green, as does the equivalent interaction between B and D. Furthermore, green is also obtained from interactions between A and B, A and D, B and C and C and D. This is illustrated in FIGURE 2 where the incident white light has its green component reflected and its red component transmitted through the multilayered platelet.

This is the optimum combination for green reflection from three first order layers; further intensification can be obtained by increasing the thickness of the layers so as to produce higher order reflections or by adding additional layers.

A plate consisting of ZnS would only produce a green reflection if its thickness were approximately 140 m$\mu$. Only two reflections are possible from a simple plate, and their interaction would produce green. By the use of only approximately 50 percent more material, as in the 59–96–59 m$\mu$ composite under discussion, there are twice as many reflecting surfaces which can produce green by three different interactions of good effectiveness and three more of low effectiveness. Thus the platelet is greatly improved as a source of color, as a light reflector, and as a pigment.

It is obviously desirable to have a symmetrical structure in making the composites where color is desired. In the example above, for example, the first and third layers are equal in thickness. This condition can readily be achieved by the vacuum evaporation method of production. Symmetry is unnecessary for a composite producing white nacreous luster.

The multiple layered platelets of this invention are conveniently made by simultaneous deposition of the high and low index substances on a moving surface. Application Serial No. 87,062 describes the simultaneous evaporation of substrate and nacreous pigment material to form alternating layers of substrate and nacreous pigment films on a rotating disc, moving belt, or other moving surface. These films are then separated by the use of a solvent which dissolves the substrate material, but not the nacreous pigment films. The nacreous pigment films tend to flake as the substrate dissolves, and then are fractured mechanically to the desired average platelet size. Platelets of different dimensions may be separated by conventional classifying and sorting techniques.

In the present invention, substrate, low index and high index substances are evaporated simultaneously, as will be made clear in the examples which follow. When the substrate dissolves, the multilayered structure remains intact, and fragmentation of the film produces multilayered platelets.

High index of refraction substances other than zinc sulfide which are suitable for use in this invention are zinc oxide, titanium dioxide, guanine, and lead chloride. Low index substances other than magnesium fluoride are cryolite ($Na_3AlF_6$) and calcium fluoride.

Among the substrate substances which can be used effectively with the nacreous pigment substances already named are alkali halides, e.g., sodium chloride, potassium chloride, sodium bromide; alkali metal borates, e.g., sodium tetraborate, potassium tetraborate; boric acid; and alkaline earth halides, e.g., magnesium chloride, calcium chloride and calcium bromide.

As was mentioned above, the long dimension of the pigment particle is controlled by mechanical fragmentation of the flakes which form when the substrate is dissolved away. For nacreous or colored effects which appear continuous to the eye, the flakes should be too small to be seen individually, but must be large enough to maintain a suitable ratio of length to thickness. The suspension or slurry of pigment flakes in liquid is easily reduced to the desired platelet size by conventional milling techniques. A size range of 2 to 100 microns is suitable for most purposes, optimum nacreous luster being obtained in the region 8 to 50 microns. Larger flakes may be used for special purposes. These will be visible as discrete flakes which have uniform color by reflected light.

The resulting nacreous, optically colored pigment can be dried or can be kept in a liquid form convenient for use. Thus the aqueous slurry can be used directly in latex systems. For resin and lacquer systems in which water is undesirable, the slurry can be filtered and the water replaced by a suitable water-miscible solvent, such as alcohol, the methyl ether of ethylene glycol, or acetone. Conventional pigment flushing techniques for transferring the pigment into organic vehicles may also be used.

Another technique for preparing the flakes in an organic medium is to use an alcohol- or acetone-soluble substrate material, such as magnesium fluoride or calcium bromide. The nacreous pigment particles are introduced directly into the organic liquid by using this liquid to separate the multilayered composites from each other.

The details of the invention are illustrated in the following examples:

*Example I*

An endless belt made of 25 mil polyester film 12 inches wide moves on two parallel, horizontal rollers of 6 inch diameter which are 36 inches apart, axis to axis, in a vacuum chamber. The region under the belt is divided into four sections approximately 7 inches long by vertical shields which are placed in a plane parallel to the axes of the rollers. Solid $Na_2B_4O_7$, the substrate material, is placed in a narrow ceramic boat 10 inches long which is mounted (with its long dimension parallel to the roller axes) about 5 inches below the bottom surface of the belt and at the center of the first section.

Solid ZnS is placed in a similar boat under the belt in the second section. $MgF_2$ is placed in a boat in the third section, and additional ZnS in a boat in the fourth section.

Each boat is protected by a shield which can be manipulated from outside the vacuum chamber to prevent premature deposition on the belt.

The apparatus is pumped down to a pressure of approximately $10^{-4}$ mm. of mercury, and the belt is set moving at a linear rate of about 500 inches per minute. The direction is such that the belt will first become coated with $Na_2B_4O_7$. After several minutes of heating, during which steady evaporation rates are attained, the protective shields are removed, and the belt is coated for 60 minutes during which 600 layers of the evaporated materials are deposited. The ZnS and $MgF_2$ films have thickness of approximately 40 m$\mu$, and the $Na_2B_4O_7$ film a thickness of approximately 100 m$\mu$.

After cooling and bringing to atmospheric pressure, the belt is removed and washed with approximately 1 liter of water at ambient temperature. The nacreous pigment composite film flakes off as the $Na_2B_4O_7$ dissolves. The rather large flakes are reduced to an average diameter of 25 microns by passing the suspension through a colloid mill.

The nacreous pigment particles are filtered and washed borate-free with water. They may then be dried and used as a nacreous pigment for making pearl plastics, or, more conveniently, may be washed water-free with a water miscible solvent like isopropanol. The isopropanol-wet cake can then be dispersed in, for example, a cellulose nitrate lacquer, and the nacreous effect of the pigment demonstrated by coating alabaster glass beads to make simulated pearls.

*Example II*

Green-reflecting platelets are made as in Example I. In this case the $MgF_2$ film is 96.4 m$\mu$ and the ZnS films 59 m$\mu$ in thickness.

*Example III*

Green-reflecting platelets are made as in Example I, but the composite consists of a ZnS film sandwiched between two $MgF_2$ films. In this case, the $MgF_2$ films are each 96.4 m$\mu$ and the ZnS film 59 m$\mu$ in thickness. The color is less intense in this version than in Example II.

*Example IV*

Green-reflecting platelets consisting of four layers, i.e., ZnS (59 m$\mu$)—$MgF_2$ (96.4 m$\mu$)—ZnS (59 m$\mu$)—$MgF_2$ (96.4 m$\mu$), are made by the modification of Example I in which the disc area is divided into five parts instead of four. The platelets have more intense color than those of Example I.

*Example V*

Blue-reflecting platelets consisting of zinc oxide and cryolite are prepared by the method of Example I, using $MgCl_2$ as substrate. The structure is ZnO (34 m$\mu$)—cryolite (124 m$\mu$—ZnO (34 m$\mu$). The indices of refraction are 1.9 and approximately 1.33 for ZnO and cryolite, respectively.

*Example VI*

Red-reflecting platelets are made by the procedure of Example I from guanine and calcium fluoride. The composites have the structure guanine (90 m$\mu$)—$CaF_2$ (116 m$\mu$)—guanine (90 m$\mu$). Guanine and $CaF_2$ have indices of refraction of approximately 1.80 and 1.40, respectively.

*Example VII*

Yellow-reflecting platelets of guanine and magnesium fluoride are made by the method of Example I. The platelets have the structure guanine (120 m$\mu$)—$MgF_2$ (55 m$\mu$)—guanine (120 m$\mu$).

*Example VIII*

Blue-reflecting platelets of titanium dioxide and magnesium fluoride are made by the method of Example I, and have the composition $TiO_2$ (50 m$\mu$)—$MgF_2$ (89 m$\mu$)—$TiO_2$ (50 m$\mu$). The index of refraction of the $TiO_2$ film is approximately 2.4.

*Example IX*

Red simulated pearls with green highlights are made from the green-reflecting platelets of Example II. The isopropanol-wet paste of the platelets is dispersed in nitrocellulose dipping lacquer to give a suspension containing 1.5% pigment. Alabaster glass beads are then dipped into this suspension, becoming coated with a nacreous layer with red-green color play. The red effect appears because the observed light is reflected from the bead and passes through the platelet layer.

*Example X*

An interference filter which transmits red light and reflects green light is made from the platelets of Example I. Sufficient isopropanol suspension is dispersed in a syrup made by the partial polymerization of methyl methacrylate monomer to give a pigment concentration of 0.25 percent. After the addition of catalyst (such as 1.0 percent of 25 percent acetyl peroxide in dimethyl phthalate), the platelet-syrup suspension is poured into a casting cell consisting of two glass plates held apart by a one-eighth inch gasket made of flexible tubing. The cell is immersed in a water bath at 50° C. for 6 hours, and, on being opened, yields a polymethyl methacrylate sheet which is green by reflected light and red by transmitted light.

*Example XI*

The dried pigment particles of Example I are mixed with cellulose acetate molding powder which is then extruded to give a nacreous rod which appears red except for the highlight which is green. The rod may be made into beads of jewelry or may be used for furniture legs, shelf supports, etc.

It is apparent from the foregoing examples which deal with the production of the pigment particles that the quantity of heat supplied to the pigment materials and to the substrate material during the vacuum evaporation must be such as to produce the desired film thickness with the belt, disc or other device moving at a particular velocity. The actual rate of heating is determined by the specific geometry of the assembly as well as by the rate of motion and the desired film thickness.

The temperatures used are naturally dependent on the temperature at which the particular pigment-forming substance or substrate material evaporates, which typically would be about 1300° C. for ZnS and $MgF_2$, 250° C. for guanine, 750° C. for sodium tetraborate and 500° C. for NaCl.

The surface upon which the films are deposited should be inert to the substances being deposited, is preferably a smooth surface and typically would be an endless belt of cellulose acetate, cellulose, polyfluorocarbon, polyethylene, or polyester film. The plastic film may be modified, if desired, by metallizing, e.g., coating with aluminum or other metal by evaporation. A rotating disc used for the deposition may have a glass or smooth metal surface. A smooth metal surface is also utilized in the convenient device of a rotating metal drum, deposition taking place on the polished outer surface; stainless steel or chromium is particularly suitable. Ceramic surfaces may also be used.

Superior nacreous luster is obtained when $Nd$ for the individual layers of the composite falls in the range from about 10 to about 200. In the case of composites of more than two layers, it is possible that interference colors may appear from some combinations when the component layers are in the $Nd$ range 10 to 200, even though the individual layers would not produce color alone. When a color effect is not desired, it can be eliminated or reduced by avoiding equal thicknesses in every second layer. Color possibilities are also minimized by restricting the individual layers to small $Nd$ values, i.e., below 100.

It will be observed that the index of refraction given for many of the evaporated films is smaller than the index for the same substance in crystalline form. The index of refraction can be increased without losing the shape of the particle by calcining at a suitable temperature. For example, the $ZnS$—$MgF_2$—$ZnS$ films can be calcined at 400° C. to crystallize the ZnS as sphalerite, thus raising the index of refraction of the ZnS from 2.2 to 2.37. The $TiO_2$—$MgF_2$—$TiO_2$ flakes of Example VII can be calcined at 800° C. to convert the $TiO_2$ to rutile with an index above 2.6. Reflectivity and color intensity is increased by the increase in refractive index.

It is also clear that numerous combinations of high and low index of refraction substances can be employed. It is necessary only that the combinations of thickness and index of refraction be such as to give the greatest preponderance of a given color in accordance with the equations for light interference.

In the foregoing, the invention has been described only in connection with preferred embodiments thereof. Many variations and modifications of the principles of the invention within the scope of the description herein are obvious. Accordingly, it is preferred to be bound not by the specific disclosure, herein, but only by the appending claims.

We claim:
1. A nacreous pigment having, as a nacre-producing substance therein, platelike particles comprising a plurality of thin, adherent, light-transmitting layers, the multiplication product ($Nd$) of the thickness ($d$) of the nacre-producing layers in such particles expressed in millimicrons and the index of refraction (N) of each of said layers being between about 10 and 200.

2. A pigment deriving color from the interference of light and having as the color producing substance therein platelike particles comprising a plurality of thin, adherent, light-transmitting layers, the multiplication product ($Nd$) of the thickness ($d$) of the color-producing layers in such particles expressed in millimicrons and the index of refraction (N) of each of said layers being between about 100 and 200.

3. A nacreous pigment having, as a nacre-producing substance therein, platelike particles comprising a plurality of thin, adherent, light-transmitting layers, the refractive index of each layer differing from that of the adjacent layer by at least 0.4, the multiplication product ($Nd$) of the thickness ($d$) of the nacre-producing layers expressed in millimicrons and the index of refraction (N) of each of said layers being between about 10 and 200.

4. The pigment of claim 3 in which the nacre-producing particles consist of 3 layers.

5. The pigment of claim 4 in which the two outer layers are of a higher refractive index than the middle layer.

6. The pigment of claim 5 in which the layer having the higher index of refraction is from the group consisting of zinc sulfide, zinc oxide, titanium dioxide, guanine, and lead chloride.

7. A pigment deriving color from the interference of light and having as the color producing substance therein platelike particles comprising a plurality of thin, adherent, light-transmitting layers, the refractive index of each layer differing from that of the adjacent layer by at least 0.4, the multiplication product ($Nd$) of the thickness ($d$) of the color-producing layers in such particles expressed in millicrons and the index of refraction (N) of each of said layers being between about 100 and 200.

8. A nacreous article comprising a light-transmitting supporting medium having, as a nacre-producing substance therein, platelike particles comprising a plurality of thin, adherent, light-transmitting layers, the multiplication product ($Nd$) of the thickness ($d$) of the nacre-producing layers in such particles expressed in millimicrons and the index of refraction (N) of each of said layers being between about 10 and 200.

References Cited in the file of this patent

UNITED STATES PATENTS

| | | |
|---|---|---|
| 2,863,783 | Greenstein | Dec. 9, 1958 |
| 2,950,981 | Miller et al. | Aug. 30, 1960 |
| 3,008,844 | Grunin et al. | Nov. 14, 1961 |

UNITED STATES PATENT OFFICE
CERTIFICATE OF CORRECTION

Patent No. 3,123,490 March 3, 1964

René A. Bolomey et al.

It is hereby certified that error appears in the above numbered patent requiring correction and that the said Letters Patent should read as corrected below.

Column 2, line 46, after "re-" insert -- spectively, the former having the advantage when the --; line 55, for "nacerous" read -- nacreous --.

Signed and sealed this 21st day of July 1964.

(SEAL)
Attest:

ESTON G. JOHNSON
Attesting Officer

EDWARD J. BRENNER
Commissioner of Patents